(12) United States Patent
Knapp et al.

(10) Patent No.: US 9,199,177 B2
(45) Date of Patent: *Dec. 1, 2015

(54) PERFORMANCE BASED GOLF SCORING SYSTEM

(71) Applicant: Big Play Scoring, LLC, Houston, TX (US)

(72) Inventors: Michael Knapp, Houston, TX (US); Jack Stanfield, Houston, TX (US); Michael Duvall, Houston, TX (US); Jeff James, Houston, TX (US)

(73) Assignee: Big Play Scoring, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,326

(22) Filed: Jun. 3, 2015

(65) Prior Publication Data

US 2015/0265925 A1     Sep. 24, 2015

Related U.S. Application Data

(63) Continuation-in-part of application No. 14/470,600, filed on Aug. 27, 2014, which is a continuation-in-part of application No. 14/336,408, filed on Jul. 21, 2014, now abandoned, and a continuation-in-part of application No. 13/785,748, filed on Mar. 5, 2013, now Pat. No. 8,944,921.

(60) Provisional application No. 61/684,245, filed on Aug. 17, 2012, provisional application No. 61/606,536, filed on Mar. 5, 2012, provisional application No. 61/684,245, filed on Aug. 17, 2012, provisional application No. 61/606,536, filed on Mar. 5, 2012.

(51) Int. Cl.
| A63B 71/06 | (2006.01) |
| A63F 13/573 | (2014.01) |
| A63F 13/77 | (2014.01) |
| A63F 13/53 | (2014.01) |
| A63F 13/35 | (2014.01) |
| A63F 13/65 | (2014.01) |
| A63F 13/46 | (2014.01) |
| A63F 13/828 | (2014.01) |

(52) U.S. Cl.
CPC ............... *A63F 13/573* (2014.09); *A63F 13/35* (2014.09); *A63F 13/46* (2014.09); *A63F 13/53* (2014.09); *A63F 13/65* (2014.09); *A63F 13/77* (2014.09); *A63F 13/828* (2014.09)

(58) Field of Classification Search
CPC ....................................................... A63B 71/06
See application file for complete search history.

(56) References Cited

U.S. PATENT DOCUMENTS

| 6,371,855 B1 | 4/2002 | Gavriloff |
| 6,656,042 B2 | 12/2003 | Reiss |
| 7,614,944 B1 | 11/2009 | Hughes et al. |
| 2006/0252476 A1 | 11/2006 | Bahou |

FOREIGN PATENT DOCUMENTS

WO     2010/085429 A1     7/2010

*Primary Examiner* — Paul A D'Agostino
*Assistant Examiner* — Ankit Doshi
(74) *Attorney, Agent, or Firm* — Hulsey Hunt & Parks, P.C.

(57) ABSTRACT

An automated, replicable, process-based original concept that may provide a self-validating, defined quantification of the relevance of one or more active physical efforts performed by a real-life golfer, the real-life golfer engaging in at least one real-life play on a golf ball on a golf course with a predefined traditional point value for certain plays.

31 Claims, 2 Drawing Sheets

PERFORMANCE BASED GOLF SCORING SYSTEM

CROSS-REFERENCE TO RELATED APPLICATIONS

This application claims priority to patent application Ser. No. 14/470,600 filed Aug. 27, 2014, which claims the benefit of both patent application Ser. No. 14/336,408 filed Jul. 21, 2014 and patent application Ser. No. 13/785,748 filed Mar. 5, 2013, both of which claim the benefit of Provisional Patent Application No. 61/684,245 filed Aug. 17, 2012 and Provisional Patent Application No. 61/606,536 filed Mar. 5, 2012. All of the above mentioned patent applications are incorporated herein by reference in their entireties.

TECHNICAL FIELD

This disclosure relates in general to a scoring system and more particularly to a scoring system for measuring performance data of a real-life golfer engaging in at least one real-life play on a golf ball on a golf course.

BACKGROUND

Fantasy sport leagues are becoming widespread through the United States and the world. Fantasy sports allow sports fans to take an active role in professional or collegiate sports where the sports fans act as team owners to build a team that competes against other fantasy sport teams. The fantasy sport team owner creates their own roster of players by drafting players from actual professional or collegiate sports teams and use those players' real-life performance in professional or collegiate games to convert statistical performance into points. However, current fantasy sport leagues are organized and scored in such a manner that in order to be successful, the participant must be a real sports enthusiast with time to follow entire leagues of players and teams, rendering the fantasy sports leagues less accessible to moderate sports fans.

Fantasy sport leagues may be based upon a number of different sports, including, but not limited to: football, basketball, baseball, hockey, soccer, cricket, golf, auto racing, mixed martial arts, professional wrestling, boxing, billiards, bowling, chess, etc. The fantasy sport leagues can even further be based upon the different leagues or associations within a sport. For example, a fantasy football league may be based upon the National Football League or it may be based upon NCAA Collegiate football. Similarly, a fantasy basketball league may be based only on the National Basketball Association's (NBA) Eastern Conference or Western Conference. Some fantasy sport leagues may be even further limiting, and restrict fantasy sport leagues to only certain teams or even certain categories of players.

There currently exist many different scoring systems and corresponding fantasy points. Generally, fantasy points are based upon actual player or team performance in a particular game or event. Probably the most common scoring system converts statistical performance of real-life players or teams into fantasy points that are compiled and totaled according to a selected roster of the fantasy team. More complex variants may include computer modeling of actual games, but based upon selected fantasy roster, based on statistical input generated by real-life players or teams. However, different sports fantasy leagues often include different scoring systems that can make certain players or teams more or less valuable in one fantasy sports league as opposed to another different fantasy sports league.

One exemplary scoring system, head-to-head league scoring, is based on fantasy teams competing weekly to see which teams can compile the best statistics across a number of different scoring categories, with "wins" awarded based on the cumulative total for each scoring category used in the league for the week. Using basketball as an example, the league may be set up to use points scored, rebounds, assists, blocked shots, field goal percentage (FG %), free throw percentage (FT %) and 3 pointers made as scoring categories. If in a given week, a team has more assists than its opponent's, the team would be credited with a "win" for that scoring category. However, if the opponent's team ended the week with more blocked shots, the team be charged with a "loss" for that scoring category. If the two teams end up tied in a given category, each will receive credit for a "tie". This weekly win-loss-tie total will be added to a cumulative season record, which can be used to determine final standings or playoff seeding. These standings will be based on your team's overall winning percentage, which is calculated by taking your win total and adding one-half of your tie total and dividing the sum by the total number of games your team has played. Unfortunately, this requires the fantasy sport league participant to draft and form teams based on their ability to produce in various scoring categories. This requires a deep knowledge of individual players and team; consequently, most sports fans merely root for their hometown teams, without the underlying knowledge of sports statistics.

Another exemplary scoring system, the fantasy point league scoring, is based on points being awarded on how well players perform in each of predetermined statistical scoring categories. All real-life statistics have associated point values, and each player's points are summed to produce daily totals. Using football as an example, the league may be set up to give a certain number of fantasy points for touchdowns scored, rushing yards, passing yards, receiving yards, field goals, etc. If in the league, a touchdown is worth six points, 10 rushing yards worth one point, and 10 receiving yards worth one point, a player with two touchdowns, 100 yards rushing, and 30 yards receiving would score 12 points for two touchdowns, 10 points for 100 rushing yards and 3 points for 30 receiving yards, which would total 25 fantasy points for that player. Fantasy points are only awarded to starting players on your fantasy team's roster. This scoring method may be used to determine a weekly, head-to head winner as is frequently used in fantasy football leagues. Alternatively, it may be used to keep a running total of fantasy points throughout the season as is commonly used in fantasy basketball, football and baseball leagues. In these leagues, the team with the highest total of fantasy points at the end of the year is the league champion. This scoring system suffers from the same drawbacks as head-to-head league scoring, namely, that fantasy sports league participants require extensive knowledge of individual players' statistics and is further compounded with the fact that only players on the roster generate points. Fantasy sports league participants often need to change up their rosters in response to real-life player injuries or underperformance.

Many of these scoring drawbacks are evident in the fantasy sport team formation process, often referred to as the draft. The goal of the draft is to choose the players that the fantasy sport league participant believes will generate the most fantasy points. These participants choose real-life players based upon published statistics for that player and draft the player onto their fantasy team based upon availability and whatever other information they have gathered. Preparation for this draft process can be an incredibly time consuming effort, especially where the fantasy sport league's scoring system is complex. Additionally, the choice of players and their position within the roster can be a tedious process.

Another scoring drawback is the inability to weight particular plays, accomplishments, or successes. Each "win" or each accomplishment is awarded the same points (e.g. one point for each 20 yards of rushing). Existing fantasy sports scoring systems have attempted to address this by adjusting the accomplishment instead of the scoring itself (e.g. one point for 30 yards of rushing as opposed to one point for 20 yards of rushing). Furthermore, existing fantasy sports scoring are based on the total statistics for a player (e.g. the entire games total in a certain statistical area).

Although various scoring systems for fantasy sport leagues are known in the art, all, all of them suffer from one or more disadvantages. Therefore a need has arisen for a more automated and replicable scoring system which corrects the problems identified above.

SUMMARY

The following disclosure presents concepts for improving scoring systems of fantasy sport leagues for real-life American-style football and its adaptations. The disclosed subject matter significantly improves upon prior scoring systems aimed at measuring real-life player or team performance. It is an object of the present disclosure to provide self-validation, defined quantification of relevant and active physical efforts performed by competing real-life football teams engaging in real-life American-style football contests or its adaptations.

The present disclosure teaches an automated, replicable scoring process, wherein there is a defined quantification of the relevance of active physical efforts performed by real-life golfers engaging in real-life plays on golf balls on a golf course, resulting in ranking of participants based on their performance relative to another.

Embodiments of the present disclosure may provide predetermined point levels for achievements within a game.

Embodiments of the present disclosure may provide the ability to simplify fantasy league scoring for participants.

Embodiments of the present disclosure may provide the ability for multiple fantasy sport league participants to score on the same play.

Embodiments of the present disclosure may provide a hybrid team challenge wherein multiple participants may compete in their knowledge of golf in various scoring components.

Embodiments of the present disclosure may provide random, auto-generated selections of scoring components.

Embodiments of the present disclosure may provide the opportunity to foster continued engagement with the system by including additional scoring opportunities.

Embodiments of the present disclosure may provide recognition of achievements by fantasy sport league participants.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of the appended claims and/or those claims filed later.

BRIEF DESCRIPTIONS OF THE DRAWINGS

The novel features believed characteristic of the presently disclosed subject matter are set forth in the claims appended hereto or will be set forth in any claims that are filed later. The presently disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE SPECIFIC EMBODIMENTS

Although described with particular reference to golf, those with skill in the arts will recognize that the disclosed embodiments have relevance to adaptations of golf in addition to those specific examples described below.

All references, including publications, patent applications, and patents, cited herein are hereby incorporated by reference to the same extent as if each reference were individually and specifically indicated to be incorporated by reference and were set forth in its entirety herein.

The present disclosure in an embodiment enables an alternative analysis method and scoring system for golf and its adaptations as described herein.

Football enthusiasts have often wondered why an exemplary 14-10 game can be infinitely more compelling than a second exemplary 27-24 game. It is counter-intuitive that the game with fewer points scored can be immeasurably more entertaining to watch than the contest with more points. However, if one takes a step back and takes an objective view of the sport, football is essentially an offensive team of eleven players that have four chances, or downs, to advance the ball ten yards from the spot they took possession of it. At the same time, the opposing team's set of eleven defensive players are trying to thwart that ten yard advance. The majority of the game is comprised of small back and forth gains and losses. A few yards may be gained by throwing or running, and a few yards lost by being tackled. However, very little of this has a direct impact on the points that end up on the scoreboard.

For example, Quarterback A is throwing well and has thrown to advance the ball up the field for a total of 70 yards. However, as the team is trying to enter the end zone to score, multiple mistakes happen. Perhaps the running back runs the wrong route and misses his catch. Perhaps Quarterback A throws errantly too high for the receiver to catch. On the fourth down, the offense is forced to punt the ball downfield. There was a tremendous amount of effort expended, and in traditional fantasy football scoring systems Quarterback A will look great for having just completed 70 passing yards. However, none of that is reflected on the scoreboard and has no bearing on the ultimate outcome of the game. This overall back and forth, give and take process is even more evident in the game of basketball where if distilled down enough, players are just running up and down the court attempting to put the ball in the basket for two points.

In prior standard fantasy football scoring systems, the goal was to define statistical and point-value relationships to ensure that each fantasy position and player was relatively equal in weight and value with regards to the system. These are some relatively well established offensive scoring rules in fantasy football that are in use today:

Touchdowns: 6 points—In the standard fantasy football scoring system, touchdowns are universally worth 6 points, just like in real life. It does not matter if the touchdown was scored by a quarterback, receiver, running back, defensive safety, or even a kicker; all touchdowns are 6 points.

Rushing: 1 point per 10 yards—Each rushing yard in fantasy football will net the fantasy team 0.1 point if the league awards fractional points, or 1 point for every 10 yards.

Receiving: 1 point per 10 yards—Each receiving yard in fantasy football will net the fantasy team 0.1 point, or 1 point for every 10 yards.

Passing: 1 point per 25 yards—Because passing yards are much easier to come by than rushing or receiving yards, they are not worth quite as much. Passing yards in the standard scoring system are worth 0.04 point, or 1 point for every 25 yards.

Now, imagine this scenario from an exemplary football game where the following statistics were compiled for three different fantasy players. Quarterback: 375 yards passing; Running Back: 40 yards rushing, 2 touchdowns; Wide Receiver: 100 yards receiving, 1 touchdown. Each of these would have resulted in the same output: 16 fantasy football points. However, it is difficult to gauge whether these values actually helped the team gain an advantage over their competitor or whether the values are standard within the back and forth nature of the sport.

The main driver that differentiates results of games and contests are the "big plays", something out of the ordinary from the mundane regular few yard gains and losses from running and passing plays. If one watches a football game and keeps tally of the "big plays" of both teams and keeps a running total of the tally of big play points vs. points on the scoreboard, some very interesting conclusions emerge. At the conclusion of each score, period, or contest, the team with the most big plays is more likely than not to prevail on the scoreboard as well. Interestingly, big play totals will often tell a more accurate story of how close or lopsided, entertaining or boring the game really was.

The present disclosure teaches an original concept based on the awarding of points for big plays during a golf match or its adaptations relative and commensurate to both their impact on the contest as well as a more genuine reflection of the match's true level of achievement, accomplishment, and competition. Whereas other scoring systems may focus on individual statistics that may be irrelevant to results by itself, the teachings of the present disclosure provides a quantitative measurement of the plays and achievements during any given golf match or its adaptations that actually impact the game's outcome.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although described with reference to personal computers and the Internet, one skilled in the art could apply the principles discussed herein to any computing or mobile computing environment. Further, one skilled in the art could apply the principles discussed herein to communication mediums beyond the Internet.

Figure 1:
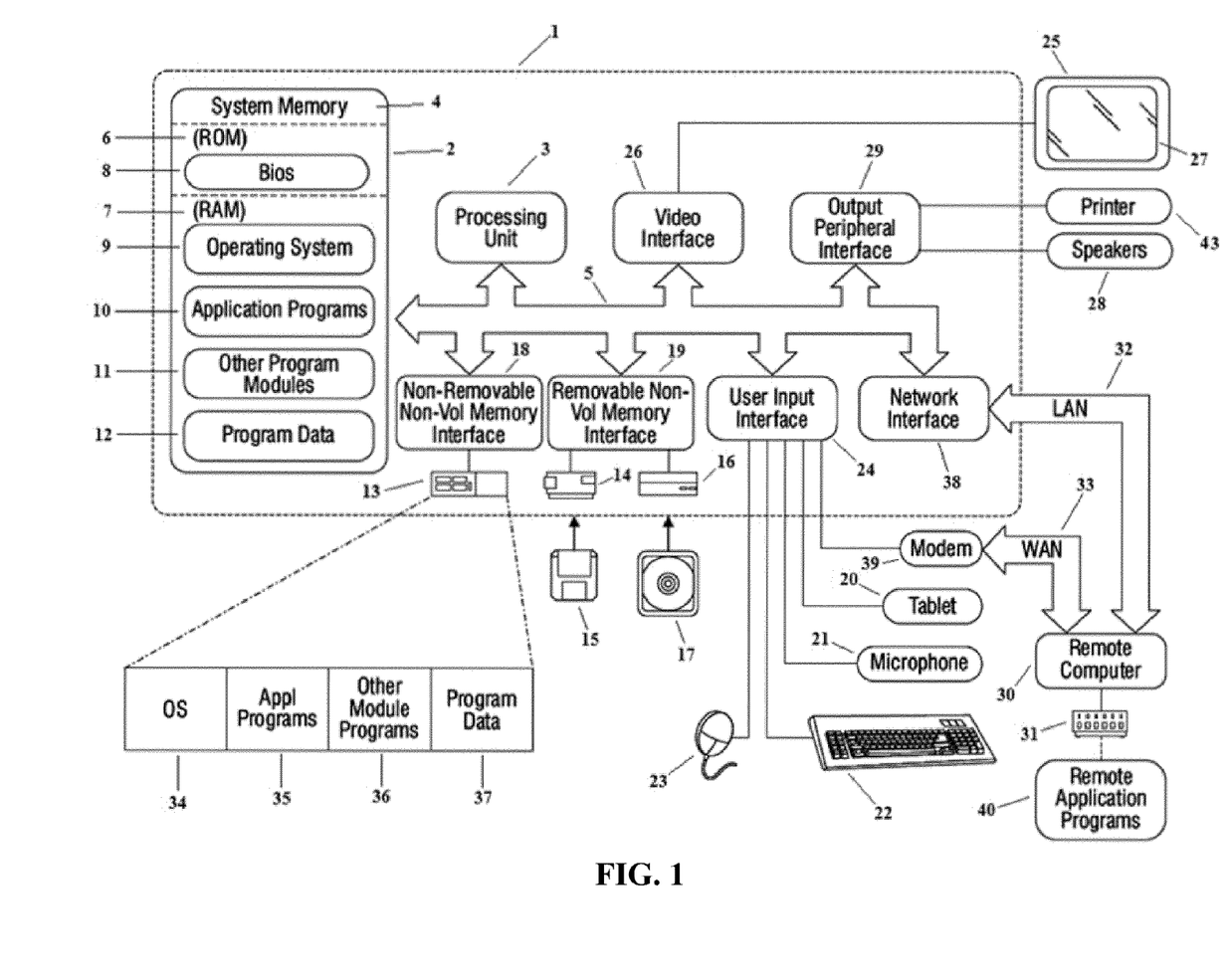
FIG. 1 displays a computing system and related peripherals that may operate with the method and system for performance based golf scoring in accordance with embodiments.

A computer-implemented method and system for performance based scoring are disclosed. IN the following description, numerous specific details are set forth. However, it is understood that embodiments may be practiced without these specific details. In other instances, well-known processes, structures, and techniques have not been shown in detail in order not to obscure the clarity of this description. FIG. 1 displays one embodiment of a computing system and related peripherals that may operate with the method and system for performance based scoring.

With reference to FIG. 1, an exemplary system within a computing environment for implementing the disclosure includes a general purpose computing device in the form of a computing system 1, commercially available from, for example, Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11 and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36 and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer, 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touch-screen panel 27 or the like. Note that the monitor and/or touch screen panel can be physically coupled to a housing in which the computing system 1 is incorporated, such as in a tablet-type personal computer. In addition, computers such as the computing system 1 may also include other peripheral output devices such as speakers 28 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, mobile electronic devices), a server, a router, a network PC, a peer device or other common network node, and typically includes many or all of the elements described above relative to the computing system 1, although only a memory storage device 31 has been illustrated. The logical connections depicted include a local area network (LAN) 32 connecting through network interface 38 and a wide area network (WAN) 33 connecting via modem 39, but may also include other networks. Such networking environments are commonplace in offices, enterprise-wide computer networks, intranets and the Internet.

For example, in the present embodiment, the computer system 1 may comprise the source machine from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

For the purposes of this disclosure, it is appreciated that the terms "device", "processor based mobile device", "mobile device", "electronic device", "processor based mobile electronic device", "mobile electronic device", and "location-capable wireless device" may be synonymous with remote computer 30.

The central processor operating pursuant to operating system software such as, but not limited to IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

The disclosure may comprise a system that may comprise at least some elements of the system previously mentioned. In embodiments, the system may comprise a processor and memory coupled to the processor. The memory may store information related to plays, point values, predefined traditional point values, and statistics. The system may further comprise a play analysis module that may be operably coupled with the processor and the memory. The play analysis module may be operable to perform one or more tasks.

In embodiments, the play analysis module may be operable to quantify one or more relevant and active physical efforts performed by a real-life golfer. The real-life golfer may engage in at least one real-life play on a golf ball on a golf course with a predefined traditional point value for certain plays. The play analysis module may receive statistics via a communications medium in real-time, wherein the statistics may directly represent at least one real-life play on a golf ball on a golf course by the golfer. The play analysis module may further analyze the golf statistics in real-time on linked processor to identify all big plays in the statistics. The big plays may be defined as play achievements performed by the golfer. In an embodiment, big plays may include negative plays. The play analysis module may further classify a subset of all possible golf plays of the plays on the golf ball on the golf course as big plays.

The play analysis module may further assign a big play point value to each of the big plays. The big play point value may be relative to an impact the big play has on a total of the at least one play on the golf ball on the golf course. In embodiments, at least one of the big play point values may be different than the predefined traditional point value of the play specified. In embodiments, at least one of the big plays is one of a possible play without a predefined traditional point value. The play analysis module may further categorize the big plays into categories, wherein the categories may comprise off the tee big plays, fairway big plays, short game big plays, and putting big plays. The categories of the big plays may correlate with the different gameplay landscapes of golf that a golfer may encounter when playing golf.

The off the tee big plays may be those big plays which may be the plays performed off of the tee with respect to at least one play on a golf ball on a golf course. The fairway big plays may be those big plays which may be the real-life plays performed from the fairway with respect to at least one on a golf ball on a golf course. The short game big plays may be those big plays which may be the plays performed from a short vicinity from the hole with respect to at least one play on a golf ball on a golf course. The putting big plays may be those big plays which may be the plays performed from a putting green with respect to at least one play on a golf ball on a golf course.

The play analysis module may further transform each of the identified big plays to the big play point values. This information may be sent and stored on the linked memory. The play analysis module may further identify big play point values for each of the big plays for each of the categories. The play analysis module may further tabulate all of the identified big play point values for each of the categories. The play analysis module may further transform computer memory to represent a total of each category.

As an example in an embodiment, sample criteria for golf may include:

Off the Tee Big Plays

| Hole Type | Points | Code | Play Description |
|---|---|---|---|
| Par 4+ | −1 | FHn | 3 in a row, and each consecutive thereafter, Fairway hit |
| Par 4+ | +1 | FMn | 2 in a row, and each consecutive thereafter, Fairway missed |
| Par 3 | −1 | GHn | 3 in a row, and each consecutive thereafter, On the green hit |
| Par 3 | +1 | GMn | 2 in a row, and each consecutive thereafter, On the green missed |
| Par 4 | −2 | OiO/4 | On in One on a Par 4 |

Fairway Play Big Plays

| Hole Type | Points | Code | Play Description |
|---|---|---|---|
| Par 4+ | −1 | GRHn | 3 in a row, and each consecutive thereafter, Greens in Regulation Hit |
| Par 4+ | +1 | GRMn | 2 in a row, and each consecutive thereafter, Greens in Regulation Missed |
| Par 5 | −2 | OiT/5 | On in Two on a Par 5 |
| All | −3 | Fsi | Full-Stroke In |

Short Game Big Plays

| Hole Type | Points | Code | Play Description |
|---|---|---|---|
| All | −1 | U-n-Dn/SSn | $3^{rd}$ in a row, and each consecutive thereafter, Up and Down/Sand Save in Regulation |
| All | −2 | Ci/Wi/Pi | Chipping In/Wedging in/Putting in |

Putting Big Plays

| Hole Type | Points | Code | Play Description |
|---|---|---|---|
| All | −1 | 1Pn | 3 consecutive 1-putts, +1 for each thereafter |
| All | −1 | P > 30 | Putt > 30' |
| All | −2 | P > 50 | Putt > 50' |
| All | +1 | 3P | 3-Putt |

In an embodiment, all other plays are awarded a value of 0.

In embodiments, the codes used for each type of golf big play may be utilized as an identifier by the play analysis module or an associated system of the disclosure.

Scoring in an exemplary embodiment is described hereinafter. It will be understood that different modifications, such as point values, may be implemented.

For the purposes of this disclosure, the term "3 in a row, and each consecutive thereafter, Fairway hit" in reference to a Par 4+ hole may refer to a golfer making a play on a golf ball from a tee and having the ball land within the fairway boundary, wherein the golfer may receive −1 point for accomplishing the task three times in a row and −1 point for every consecutive instance after the first three instances.

For the purposes of this disclosure, the term "2 in a row, and each consecutive thereafter, Fairway missed" in reference to a Par 4+ hole may refer to a golfer making a play on a golf ball from a tee and having the ball land outside of the fairway boundary, wherein the golfer may receive +1 point for accomplishing the task two times in a row and +1 point for every consecutive instance after the first two instances.

For the purposes of this disclosure, the term "3 in a row, and each consecutive thereafter, On the green hit" in reference to a Par 3 hole may refer to a golfer making a play on a golf ball from a tee and having the ball land within the green boundary, wherein the golfer may receive −1 point for accomplishing the task three times in a row and −1 point for every consecutive instance after the first three instances.

For the purposes of this disclosure, the term "2 in a row, and each consecutive thereafter, On the green missed" in reference to a Par 3 hole may refer to a golfer making a play on a golf ball from a tee and having the ball land outside of the green boundary, wherein the golfer may receive +1 point for accomplishing the task two times in a row and +1 point for every consecutive instance after the first two instances.

For the purposes of this disclosure, the term "On in One on a Par 4" in reference to a Par 4 hole may refer to a golfer making a play on a golf ball from a tee and having the ball land within the green boundary, wherein the golfer may receive −2 points for accomplishing the task.

For the purposes of this disclosure, the term "3 in a row, and each consecutive thereafter, Greens in Regulation Hit" in reference to a Par 4+ hole may refer to a golfer making one or more plays on a golf ball from a tee and/or on a fairway and having the ball land within the green boundary within a hole's "greens in regulation" amount of plays on a golf ball (may refer to the amount of strokes designated to reach the green of a hole, which may be the total number of strokes designated minus the number of putts designated), wherein the golfer may receive −1 point for accomplishing the task three times in a row and −1 point for every consecutive instance after the first three instances.

For the purposes of this disclosure, the term "2 in a row, and each consecutive thereafter, Greens in Regulation Missed" in reference to a Par 4+ hole may refer to a golfer making one or more plays on a golf ball from a tee and/or on a fairway and having the ball land outside of the green boundary within a hole's "greens in regulation" amount of plays on a golf ball (may refer to the amount of strokes designated to reach the green of a hole, which may be the total number of strokes designated minus the number of putts designated), wherein the golfer may receive +1 point for accomplishing the task two times in a row and +1 point for every consecutive instance after the first two instances.

For the purposes of this disclosure, the term "On in Two on a Par 5" in reference to a Par 5 hole may refer to a golfer making one or more plays on a golf ball from a tee and/or on a fairway and having the ball land within the green boundary, wherein the golfer may receive −2 points for accomplishing the task.

For the purposes of this disclosure, the term "Full-Stroke In" in reference to a hole of any par may refer to a golfer making one or more plays on a golf ball from a tee and/or on a fairway and having the ball land in the cup of the golf hole in one less stroke than the par of the hole in which the golfer is playing, wherein the golfer may receive −3 points for accomplishing the task.

For the purposes of this disclosure, the term "$3^{rd}$ in a row, and each consecutive thereafter, Up and Down/Sand Save in Regulation" in reference to a hole of any par may refer to a golfer making one or more plays on a golf ball from a portion of a hole off the green of a hole or a bunker and having the ball land in the cup of the golf hole in the number of strokes equal to the par of the hole in which the golfer is playing, wherein the golfer may receive −1 point for accomplishing the task three times in a row and −1 point for every consecutive instance after the first three instances.

For the purposes of this disclosure, the term "Chipping in/Wedging in/Putting in" in reference to a hole of any par may refer to a golfer making one or more plays on a golf ball and having the ball land in the cup of the golf hole from a chip-in, wedge-in, or put-in from a portion of the hole in the number of strokes equal to the par of the hole in which the golfer is playing, wherein the golfer may receive −2 points for accomplishing the task.

For the purposes of this disclosure, the term "3 consecutive 1-putts, +1 for each thereafter" in reference to a hole of any par may refer to a golfer making a play on a golf ball from a green and having the ball land in the cup of the golf hole in one putt, wherein the golfer may receive −1 point for accomplishing the task three times in a row and −1 point for every consecutive instance after the first three instances.

For the purposes of this disclosure, the term "Putt>30'" in reference to a hole of any par may refer to a golfer making a play on a golf ball from a green and having the ball land in the cup of the golf hole in one putt greater than 30 feet, wherein the golfer may receive −1 point for accomplishing the task.

For the purposes of this disclosure, the term "Putt>50'" in reference to a hole of any par may refer to a golfer making a play on a golf ball from a green and having the ball land in the cup of the golf hole in one putt greater than 50 feet, wherein the golfer may receive −2 points for accomplishing the task.

For the purposes of this disclosure, the term "3-Putt" in reference to a hole of any par may refer to a golfer making plays on a golf ball from a green and having the ball land in the cup of the golf hole in three putts, wherein the golfer may receive +1 point for accomplishing the task.

For the purposes of this disclosure, in an embodiment, the assigning of points for big plays may mirror how golf is scored, which uses negative points to denote positive golf play. For example, a positive play, such as "on in two on a Par 5" may award a golfer "minus 2" points for accomplishing the task. As a negative play example, a golfer may miss a fairway twice ("2 in a row, and each consecutive thereafter, fairway missed") and may be awarded "plus 1" point for accomplishing the task. For the purposes of this disclosure, in an embodiment, positive plays performed by a golfer may award negative points and negative plays performed by a golfer may award positive points.

In embodiments, the terms "consecutive" or "times in a row" in reference to a play instance (like those described above) may refer to one or more instances occurring on consecutive holes that a golfer is playing. In embodiments, the terms "consecutive" or "times in a row" in reference to a play instance (like those described above) may refer to one or more instances not occurring on consecutive holes that a golfer is playing. In embodiments, the terms "consecutive" or "times in a row" in reference to a play instance (like those described above) may refer to one or more instances not occurring and occurring on consecutive holes that a golfer is playing.

Figure 2:
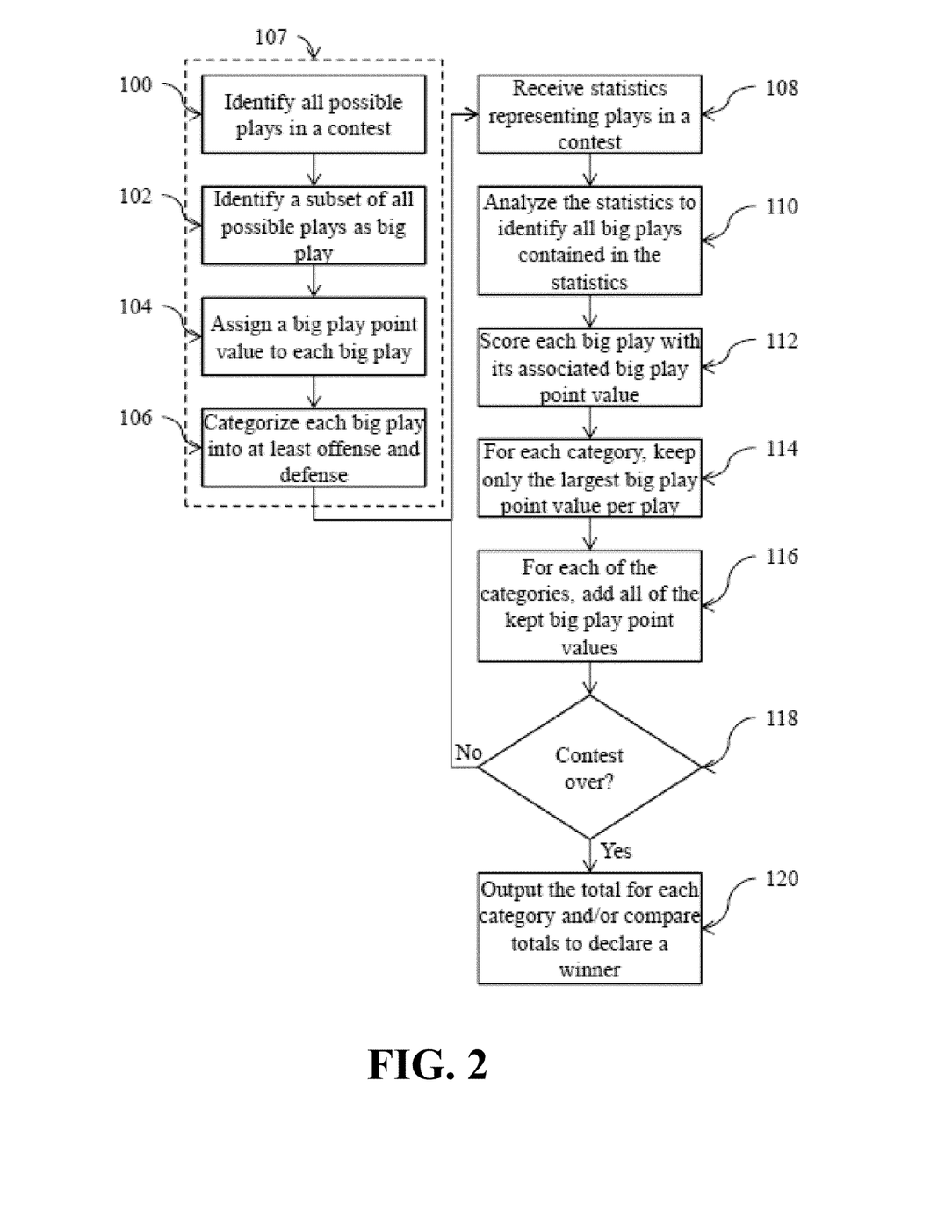
FIG. 2 depicts a generalized flow chart of a method for performance based golf scoring in accordance with one embodiment.

FIG. 2 depicts a generalized flow chart of the setup and application of the method according to the disclosed subject matter. At step 100 the possible plays in a particular contest are identified. Then some subset of the possible plays are identified as the big plays (those plays that change the moment of the game or are otherwise non-routine) 102. Each of the identified big plays are assigned a relative big play point value 104. The big play point value is an indication of just how "big" the play is when compared to the normal and routine plays in a contest. Finally, each big play is categorized, for example, into offense, defense, or both 106. Because a particular play could result in multiple big plays (e.g. first-down to first-down and a touchdown of 50+ yards for football) only the highest scoring big play is kept. By categorizing the big plays, it makes identifying which of the big plays scores the highest while still allowing each team to receive points for a big play. This completes the basic setup 107.

Statistics are received from a statistics provider which represents one or more plays in a contest 108. The statistics could be streamed live or after the end of the contest. The statistics are analyzed to identify one or more big plays 110. If there were any big plays, the big plays are scored according to the associated big play point value 112. For each play and for each category and/or participant (e.g. team) in the contest, only the largest big play point value is kept 114. For each of the categories and/or participants, all of the kept big play point values are totaled 116. If the contest is not over 118, more statistics are received 108 and the process continues. If the contest is over 118, the totals are output and/or compared to identify a winner 120.

In embodiments, alternative methods may comprise at least some elements of the method in the previous paragraphs. The methods may utilize an embodiment of a system previously mentioned. The system embodiment may be operable to perform one or more tasks within the method.

In embodiments, a method may include quantifying one or more relevant and active physical efforts performed by a real-life golfer. The real-life golfer may engage in at least one real-life play on a golf ball on a golf course with a predefined traditional point value for certain plays. As an example in embodiments, a relevant active physical effort performed by a real-life golfer may include the golfer hitting a golf ball off of the tee and having the golf ball land on the fairway on two consecutive holes on holes of Par 4 or more (with the Par 4 holes not necessarily being consecutive to each other). The golfer may receive 1 point for the accomplishment. The method may further include receiving statistics via a communications medium in real-time, wherein the statistics may directly represent at least one real-life play on a golf ball on a golf course by the golfer. The method may further include analyzing the golf statistics in real-time on a linked processor to identify all big plays in the statistics. The big plays may be defined as achievements performed by the golfer that may be recognizable to the linked processor. The method may further include classifying a subset of all possible golf plays of the plays on the golf ball on the golf course as big plays.

In embodiments, a method may further include assigning a big play point value to each of the big plays. The big play point value may be relative to an impact the big play has on a total of the at least one play on the golf ball on the golf course. In embodiments, at least one of the big play point values may be different than the predefined traditional point value of the play specified. In embodiments, at least one of the big plays is one of a possible play without a predefined traditional point value. The method may further include categorizing the big plays into categories, wherein the categories may comprise off the tee big plays, fairway big plays, short game big plays, and putting big plays. The categories of the big plays may correlate with the different gameplay landscapes of golf that a golfer may encounter when playing golf.

The off the tee big plays may be those big plays which may be the plays performed off of the tee with respect to at least one play on a golf ball on a golf course. The fairway big plays may be those big plays which may be the real-life plays performed from the fairway with respect to at least one on a golf ball on a golf course. The short game big plays may be those big plays which may be the plays performed from a short vicinity from the hole with respect to at least one play on a golf ball on a golf course. The putting big plays may be those big plays which may be the plays performed from a putting green with respect to at least one play on a golf ball on a golf course.

The method may further include transforming each of the identified big plays to the big play point values. This information may be sent and stored on the linked memory. The method may further include identifying big play point values for each of the big plays for each of the categories. The method may further include tabulating all of the identified big play point values for each of the categories. The method may further include transforming computer memory to represent a total of each category.

As a further example, scoring rules and point values for an embodiment including a fantasy golf league are disclosed hereinafter. The scoring system may be affected by designating to the golf game of a golfer (including the golfer's off the tee play, fairway play, short game play, and putting play), awards of pre-determined points for corresponding big plays. Again, these are plays and actions that are relatively exceptional when compared to regular golf performance plays. For exemplary purposes, a single put into the hole on a putting green (one-in putt) on two consecutive instances of putting on putting greens of holes may garner a point because it results in a one-in putt to a "consecutive" one-in putt. And each made one-in putt may be awarded a point after the first two one-in putts. But if the golfer gets into the same situation of putting and misses any of the one-in putts after the first two one-in putts, the golfer may not be awarded points.

In embodiments, the method and/or system may not allow for awards of multiple plays to any given team for any given one play; it will choose the big play that grants the most points. For exemplary purposes, a third "consecutive" one-in putt that was putted from a distance of greater than 50 feet would not get 1 point for making a third "consecutive" one-in putt and two points for making a put greater than 50 feet. The play would be awarded just the two points for the golfer making a put greater than 50 feet.

In embodiments, a fantasy sport participant may be able to organize a hybrid golf challenge, a big play point originated, multi-person engagement game pitting participants' knowledge of teams against one another whereby one seeks the greatest sum total of one golfer's off the tee play, one golfer's fairway play, one golfer's short game play, and one golfer's putting play. As noted previously, this enables participation by those who have a basic understanding of sport dynamics, but lack the knowledge of diehard sports fanatics and enthusiasts. All that is required to compete is the ability to pick and choose one golfer and their off the tee play, fairway play, short game play, and putting play. Participants may be able to play the hybrid golf challenge for any golf tournament. An alternative exemplary embodiment of the present disclosure is a version of the hybrid golf challenge wherein a computer system auto-generates a random selection of the four components for participation in the hybrid golf challenge. In embodiments, a participant may choose a golfer and be designated the four components for the golfer as opposed to choosing the four components from more than one golfer.

In embodiments, the scoring system may include an achievement of accurately predicting each of a tournaments top big play selections for off the tee play, fairway play, short game play, and putting play. In this way, the system may further foster participation and engagement by providing incentives for high level performance, while not necessarily having to compete against any other fantasy sport league participant.

In an embodiment, a participant may be emailed or receive communication from the computer system a chosen "Starter Golfer" that the participant selected upon registration with the fantasy league football. This "Starter Golfer" may comprise an off the tee play, fairway play, short game play, and putting play. The participant may choose to either substitute for an upcoming tournament any one or more of the off the tee play, fairway play, short game play, and putting play of the starter team (with similar or different golfers comprising each team element) or accept the original starter golfer as a hybrid golfer for the hybrid golf challenge for the upcoming week of play. The participant is not limited by other players' selections. In order for a participant to win a hybrid golf challenge, the participant must have the most total Big Play Points than any other participant. Factors that may affect a total amount of Big Play Points include weather, style of play, opponents, etc. Ties may be broken based on hybrid opponent scores and backup selections.

Furthermore, the disclosed subject matter could be integrated into, or made the focus or background or, Broadcast Studio Production and/or Pre-Game and Post-Game Analysis including past and future games.

Additionally, the teachings of the present disclosure may be enabled within broadcast content generation, sports commentary, analysis, reporting, and various social media related applications. When it comes to sports, invariably, invincibility gives way to the inevitability of diminishing strength, skills, and reflexes. With sports commentary, analysis and reporting, the magic of an original style is as infinite as the desire to improve with each and every opportunity.

Based on the point system described above, a participant may earn trophies, which can be exchanged for discounts or "Cash-in-Store" purchases on a mobile application implementing the disclosed method and/or system. A participant may receive a trophy for each proper selection of an off the tee play, fairway play, short game play, and putting play that collected the most big play points. If a participant places in the top ten of a sponsored league for three weeks, the participant may receive one trophy and one trophy each week thereafter if the participant continues to place in the top ten of the sponsored league. A participant may further earn a trophy if their league places in the top five best leagues out of the active leagues. Also, a participant who places in the top 3 of a private league for two weeks may receive one trophy and one trophy each week thereafter if the participant continues to place in the top three of the sponsored league.

Again, it is important to note that although this disclosure focuses on golf, adaptations of golf are considered within the disclosure and the disclosed subject matter could be relatively easily adapted to fit its adaptations.

Big Play Scoring, LLC strives to capture the relevant and impactful plays ("Big Plays") in golf sporting contests. Big Play Scoring, LLC has defined these Big Plays and has determined their value through a Point Valuation System. Utilizing this unique valuation approach, Big Play Scoring has created a Fantasy Game, as well as new Data Analytics of Big Play Frequency and Efficiency for analyzing sport team's performance and media content.

Big Play Frequency refers to the frequency of Big Plays based on total plays captured by each golfer element (off the tee play, fairway play, short game play, and putting play). For example, if a golfer performs 18 off the tee plays and 9 of those plays are Big Plays, the Big Play Frequency is 2 (18 divided by 9). So a Big Play occurs on average every 2nd off the tee play attempt. This Big Play Frequency can then be compared with their opponents' off the tee play Big Play Frequency or with all other golfers over a period of one or more golf tournaments.

Big Play Efficiency refers to point valuation of Big Plays based on total plays captured by each team element (off the tee play, fairway play, short game play, and putting play). For example if a golfer performs 18 off the tee plays and 9 of those plays are Big Plays, and the point valuation of those 9 Big Plays is 10, then this team has a Big Play Efficiency on offense of 55% (10 Big Play points divided by 18 off the tee plays). So in this example, 55% of total offensive plays results in scoring a Big Play point, which can then be compared with their opponent's off the tee play Big Play Frequency and with all other golfers over a period of one or more golf tournaments.

Total Team Big Play Efficiency refers to the summation of a team's Big Play Efficiency for off the tee play, fairway play, short game play, and putting play to calculate a golfer's overall efficiency performance. So if a golfer's Big Play Efficiency on off the tee play is 36%, on fairway play is 24%, on short game play is 25%, and on putting play is 50%, the Total Team Big Play Efficiency would be 135%, which can then be compared with their opponents' Total Team Big Play Efficiency and with all other golfers over a period of one or more golf tournaments.

The foregoing description of the preferred embodiments is provided to enable a person skilled in the art to make or use the claimed subject matter. Various modifications to these embodiments, including changing point values and/or adding or deleting point opportunities, will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Further, although exemplary devices and figures to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

The invention claimed is:
1. A system comprising:
a processor;
a memory coupled to the processor to store information related to plays, point values, predefined traditional point values, and statistics; and
a play analysis module, operably coupled with the processor and the memory, operable to:
quantify one or more relevant and active physical efforts performed by a real-life golfer, the real-life golfer engaging in at least one real-life play on a golf ball on a golf course with a predefined traditional point value for certain plays;
receive statistics via a communications medium in real-time, said statistics directly representing at least one real-life play on the golf ball on the golf course by the real-life golfer;

analyze the statistics in real-time on the processor to identify all big plays in the statistics, wherein the big plays are defined as an achievement performed by the real-life golfer;

classify a subset of all possible plays of the at least one real-life play on the golf ball on the golf course as big plays;

assign a big play point value to each of the big plays, the big play point value relative to an impact the big play has on a total of the at least one real-life play on the golf ball on the golf course, wherein at least one of the big play point values is different than the predefined traditional point value, and wherein at least one of the big plays is one of the all possible plays without the predefined traditional point value;

categorize the big plays into categories, the categories comprising off the tee big plays, fairway big plays, short game big plays, and putting big plays;

the off the tee big plays being those big plays which are the real-life plays performed off of the tee with respect to the at least one real-life play on the golf ball on the golf course;

the fairway big plays being those big plays which are the real-life plays performed from the fairway with respect to the at least one real-life play on the golf ball on the golf course;

the short game big plays being those big plays which are the real-life plays performed from a short vicinity from the hole with respect to the at least one real-life play on the golf ball on the golf course; and the putting big plays being those big plays which are the real-life plays performed from a putting green with respect to the at least one real-life play on the golf ball on the golf course;

transform each of the identified big plays to the big play point values;

identify the big play point value for each of the big plays for each of the categories;

tabulate all of the identified big play point values for each of the categories; and transform computer memory to represent a total of each category.

2. The system of claim 1, wherein the system is further operable to repeat the receiving, analyzing, classifying, assigning, categorizing, transforming, identifying, and tabulating for the at least one real-life play on the golf ball on the golf course.

3. The system of claim 1, wherein the big play point values are based on element achievements.

4. The system of claim 1, wherein all of the big play point values are accumulated to determine the true level of achievement and competition in the at least one real-life play on the golf ball on the golf course.

5. The system of claim 1, the apparatus used in conjunction with a fantasy sports league, by selecting a "hybrid performance" comprised of at least an off the tee element, a fairway element, a short game element, and a putting element from the at least one real-life play on the golf ball on the golf course by the real-life golfer.

6. The system of claim 5, wherein selecting the off the tee element, the fairway element, the short game element, and the putting element is not limited by selections of the off the tee element, the fairway element, the short game element, and the putting element by participants of the fantasy sports league.

7. The system of claim 1, the system used in conjunction with a sports broadcast.

8. The system of claim 1, the system used in conjunction with sports gambling.

9. The system of claim 1, wherein a big play frequency is determined for the big plays.

10. The system of claim 1, wherein a big play efficiency is determined for the big plays.

11. The system of claim 1, wherein a total team big play efficiency is determined for the big plays.

12. An article of manufacture comprising at least one non-transitory data storage device having one or more computer programs stored thereon and operable on one or more computing systems to:

quantify one or more relevant and active physical efforts performed by a real-life golfer, the real-life golfer engaging in at least one real-life play on a golf ball on a golf course with a predefined traditional point value for certain plays;

receive statistics via a communications medium in real-time, said statistics directly representing at least one real-life play on the golf ball on the golf course by the real-life golfer;

analyze the statistics in real-time on a processor to identify all big plays in the statistics, wherein the big plays are defined as an achievement performed by the real-life golfer;

classify a subset of all possible plays of the at least one real-life play on the golf ball on the golf course as big plays;

assign a big play point value to each of the big plays, the big play point value relative to an impact the big play has on a total of the at least one real-life play on the golf ball on the golf course, wherein at least one of the big play point values is different than the predefined traditional point value, and wherein at least one of the big plays is one of the all possible plays without the predefined traditional point value;

categorize the big plays into categories, the categories comprising off the tee big plays, fairway big plays, short game big plays, and putting big plays;

the off the tee big plays being those big plays which are the real-life plays performed off of the tee with respect to the at least one real-life play on the golf ball on the golf course;

the fairway big plays being those big plays which are the real-life plays performed from the fairway with respect to the at least one real-life play on the golf ball on the golf course;

the short game big plays being those big plays which are the real-life plays performed from a short vicinity from the hole with respect to the at least one real-life play on the golf ball on the golf course; and the putting big plays being those big plays which are the real-life plays performed from a putting green with respect to the at least one real-life play on the golf ball on the golf course;

transform each of the identified big plays to the big play point values;

identify the big play point value for each of the big plays for each of the categories;

tabulate all of the identified big play point values for each of the categories; and transform computer memory to represent a total of each category.

13. The article of manufacture of claim 12, wherein the big play point values are based on team element achievements.

14. The article of manufacture of claim 12, wherein all of the big play point values are accumulated to determine the true level of achievement and competition in the at least one real-life play on the golf ball on the golf course.

15. The article of manufacture of claim 12, the article of manufacture used in conjunction with a fantasy sports league, by selecting a "hybrid performance" comprised of at least an off the tee element, a fairway element, a short game element, and a putting element from the at least one real-life play on the golf ball on the golf course by the real-life golfer.

16. The article of manufacture of claim 15, wherein selecting the off the tee element, the fairway element, the short game element, and the putting element is not limited by selections of the off the tee element, the fairway element, the short game element, and the putting element by participants of the fantasy sports league.

17. The article of manufacture of claim 12, the article of manufacture used in conjunction with a sports broadcast.

18. The article of manufacture of claim 12, the article of manufacture used in conjunction with sports gambling.

19. The article of manufacture of claim 12, wherein a big play frequency is determined for the big plays.

20. The article of manufacture of claim 12, wherein a big play efficiency is determined for the big plays.

21. The article of manufacture of claim 12, wherein a total team big play efficiency is determined for the big plays.

22. A computer-implemented method comprising:
quantifying one or more relevant and active physical efforts performed by a real-life golfer, the real-life golfer engaging in at least one real-life play on a golf ball on a golf course with a predefined traditional point value for certain plays;
receiving statistics via a communications medium in real-time, said statistics directly representing at least one real-life play on the golf ball on the golf course by the real-life golfer;
analyzing the statistics in real-time on a processor to identify all big plays in the statistics, wherein the big plays are defined as an achievement performed by the real-life golfer;
classifying a subset of all possible plays of the at least one real-life play on the golf ball on the golf course as big plays;
assigning a big play point value to each of the big plays, the big play point value relative to an impact the big play has on a total of the at least one real-life play on the golf ball on the golf course, wherein at least one of the big play point values is different than the predefined traditional point value, and wherein at least one of the big plays is one of the all possible plays without the predefined traditional point value;
categorizing the big plays into categories, the categories comprising off the tee big plays, fairway big plays, short game big plays, and putting big plays;
the off the tee big plays being those big plays which are the real-life plays performed off of the tee with respect to the at least one real-life play on the golf ball on the golf course;
the fairway big plays being those big plays which are the real-life plays performed from the fairway with respect to the at least one real-life play on the golf ball on the golf course;
the short game big plays being those big plays which are the real-life plays performed from a short vicinity from the hole with respect to the at least one real-life play on the golf ball on the golf course; and
the putting big plays being those big plays which are the real-life plays performed from a putting green with respect to the at least one real-life play on the golf ball on the golf course;
transforming each of the identified big plays to the big play point values;
identifying the big play point value for each of the big plays for each of the categories;
tabulating all of the identified big play point values for each of the categories; and
transforming computer memory to represent a total of each category.

23. The method of claim 22, wherein the big play point values are based on team element achievements.

24. The method of claim 22, wherein all of the big play point values are accumulated to determine the true level of achievement and competition in the at least one real-life play on the golf ball on the golf course.

25. The method of claim 22, the method used in conjunction with a fantasy sports league, by selecting a "hybrid performance" comprised of at least an off the tee element, a fairway element, a short game element, and a putting element from the at least one real-life play on the golf ball on the golf course by the real-life golfer.

26. The method of claim 25, wherein selecting the off the tee element, the fairway element, the short game element, and the putting element is not limited by selections of the off the tee element, the fairway element, the short game element, and the putting element by participants of the fantasy sports league.

27. The method of claim 22, the method used in conjunction with a sports broadcast.

28. The method of claim 22, the method used in conjunction with sports gambling.

29. The method of claim 22, wherein a big play frequency is determined for the big plays.

30. The method of claim 22, wherein a big play efficiency is determined for the big plays.

31. The method of claim 22, wherein a total team big play efficiency is determined for the big plays.

* * * * *